Patented June 13, 1950

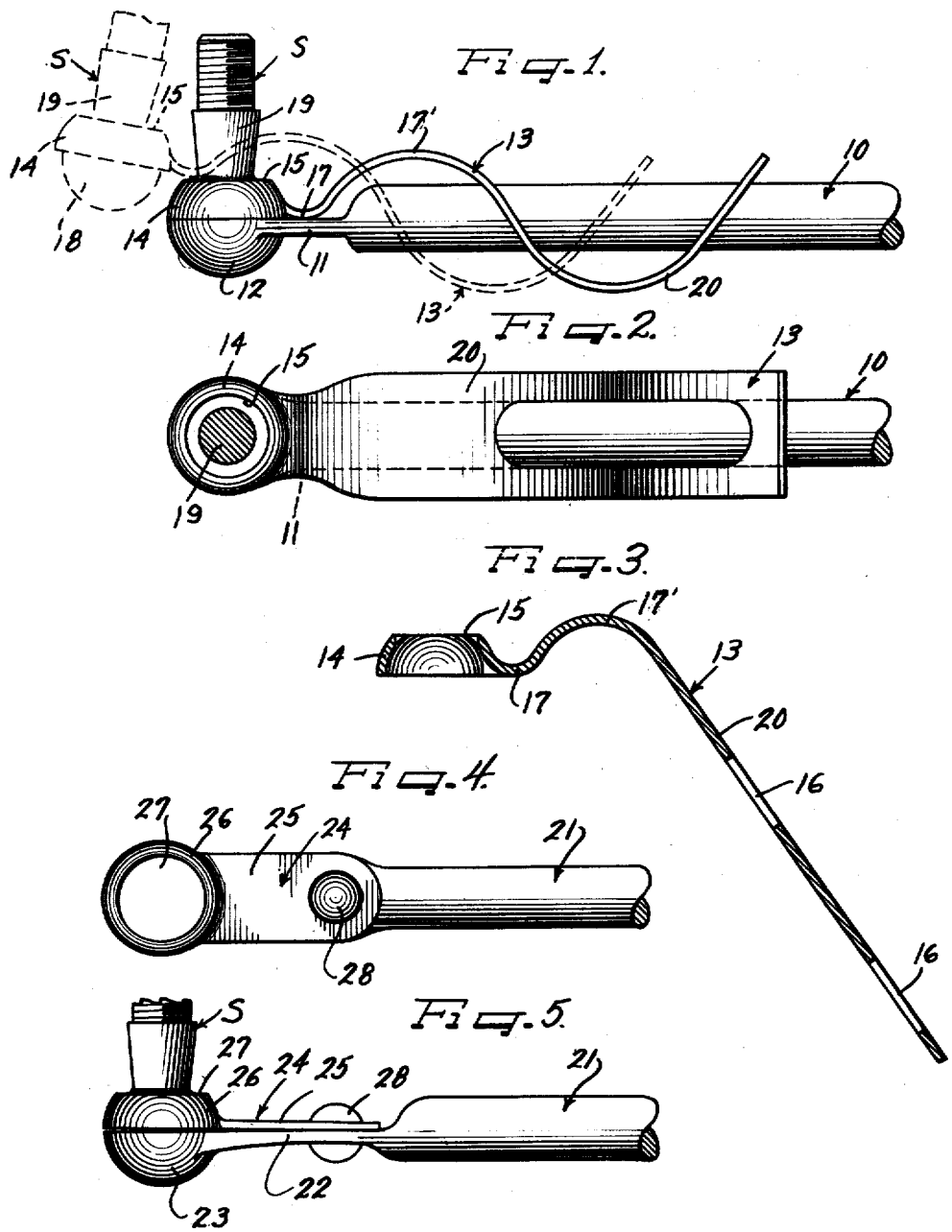

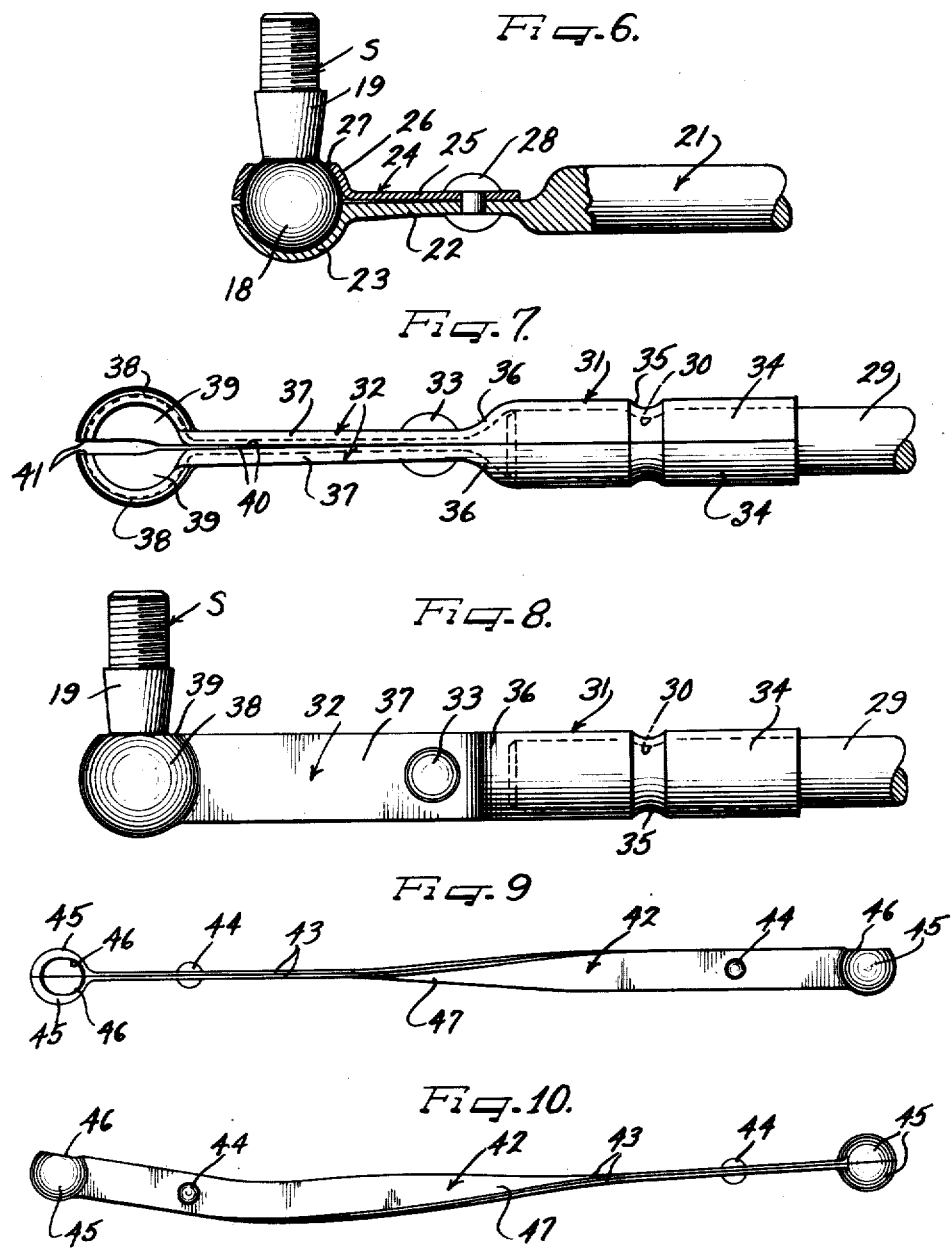

2,511,788

UNITED STATES PATENT OFFICE 2,511,788

SOCKET ASSEMBLY

Bernard E. Ricks and Donald P. Marquis, Detroit, Mich., assignors to Thompson Products, Inc., Cleveland, Ohio, a corporation of Ohio Application May 18, 1945, Serial No. 594,566

10 Claims. (Cl. 287—89)

This invention relates to socket assemblies for studs and the like wherein a socket member has a fragmental socket portion and an arm extending therefrom and a spring member has a complementary fragmental socket and an arm extending therefrom together with means connecting the arms in spaced relation from the socket portions thereof to allow the spring to deflect for resiliently retaining a stud or the like in the socket.

Specifically the invention deals with throttle rod connectors defining ball sockets that can be resiliently deflected to permit disassembly of a throttle rod without removing the ball stud from its location.

The invention will hereinafter be specifically described as embodied in ball socket connectors for throttle rods and the like, but it should be understood that the principles of this invention are generally applicable to socket assemblies especially for joints and the like.

In accordance with this invention an elongated member such as a rod, strip, or the like is stamped to form a semi-ball cup on an end thereof. An elongated spring in the form of a band or strip is stamped to form a complementary semi-ball socket for mating with the ball cup of the rod of the first mentioned member. The spring and member are connected together in spaced relation from the ball socket-defining portion thereof. Since the ball socket is formed in complementary semi-sections, at least one of which is springy, a ball stud seated in the socket is resiliently retained for universal movement and the stiffness of the socket can be controlled by the stiffness of the springy member as well as by the distance between the socket and the point of connection of the spring and first member. The socket can be opened up by deflection of the springy member to permit insertion of the ball end of the ball stud. In some forms of the invention one of the socket-forming members can be a throttle rod with the spring member detachably carried by the throttle rod to permit disassembly of the rod without removing the ball stud from its location. In other forms of the invention the socket can be separate from the throttle rod and have a hollow end adapted to receive and engage a throttle rod. In other forms of the invention both socket-defining members can be springy. In still other forms of the invention ball sockets can be formed on both ends of a connector to provide a link.

It is, then, an object of this invention to provide a socket assembly composed of a plurality of connected members having complementary socket-defining portions, with at least one of said members being springy for resiliently retaining a stud or the like in the socket.

Another object of the invention is to provide a resilient socket assembly for a stud which will accommodate disassembly of the stud and socket without removing the stud from its location.

A still further object of the invention is to provide a resilient socket assembly wherein the degree of resiliency is controlled by the length of a springy member between its anchor point and its socket-defining portion.

Another object of this invention is to provide a throttle rod connector or the like adapted to be snapped onto a throttle rod and onto the stud or the like.

A still further object of the invention is to provide an inexpensive throttle rod connector.

A specific object of the invention is to provide a socket assembly for a stud or the like which assembly is composed of a pair of socket members having arms extending therefrom with means securing said arms together in spaced relation from the socket-defining portions of the members.

Other and further objects of the invention will be apparent to those skilled in the art from the following detailed description of the annexed sheet of drawings which, by way of preferred examples, illustrates several embodiments of the invention.

On the drawings:

Figure 1 is a side elevational view of one form of resilient socket assembly according to this invention useful for throttle rods and the like, and illustrating in dotted lines the manner in which a ball stud can be inserted in the socket.

Figure 2 is a plan view of the assembly shown in Figure 1 with the ball stud shown in horizontal section.

Figure 3 is an axial cross-sectional view of the spring member for the assembly of Figures 1 and 2, illustrating the shape of the spring arm before it is mounted on the throttle rod.

Figure 4 is a plan view of another form of socket assembly for a throttle rod according to this invention.

Figure 5 is a side elevational view of the socket assembly shown in Figure 4 and illustrating a ball stud in the socket.

Figure 6 is a longitudinal vertical cross-sectional view, with parts in elevation, of the stud and socket assembly of Figure 5.

Figure 7 is a plan view of a socket assembly and throttle rod connector in accordance with this invention.

Figure 8 is a side elevational view of the assembly shown in Figure 7 illustrating a ball stud mounted in the socket.

Figure 9 is a plan view of another form of assembly and connector according to this invention.

Figure 10 is a side elevational view of the assembly shown in Figure 9.

As shown on the drawings:

In Figures 1 and 2 the reference numeral 10 designates a small diameter rod such as a throttle rod. One end of the rod is flattened as at 11 and cupped as at 12 to provide a semi-ball socket having the major diameter thereof at the open end. A spring strip 13 of a width sufficient to straddle the rod 10 has one end thereof drawn and punched to form a semi-ball socket 14 to complement the semi-ball socket 12. The ball socket 14 opens at its major diameter and an aperture 15 is formed through the top of the socket. A ball stud S has the ball end 18 thereof seated in the ball socket provided by the mating cupped ends 12 and 14 of the rod and spring. The shank 19 of the ball stud projects freely through the aperture 15 of the spring.

The spring 13 is slotted at 16 in spaced relation from the cupped end 14 thereof as best shown in Figure 3, and is bent adjacent the cupped end 14 to provide an upwardly opening loop 17 and a reverse downwardly opening loop 17' connecting the loop 17 with a downwardly inclined arm 20 containing the slots 16. The spring 13 can be tempered and the loops 17 and 17' are so cambered to result in spring pressure toward the cupped end 12 of the throttle rod when the arm 20 is deflected to receive the throttle rod 10 through the slots 16 thereof as best shown in Figure 1. The deflected arm 20 extends under the rod from the first slot and over the rod from the second slot so that the loop 17' thereof will be deflected to urge the loop 17 toward the flat portion 11 of the rod.

The spring 13 is thus so cambered that the pressure of the spring is against the socket 12 of the rod. As shown in Figure 1 in dotted lines, the spring 13 can be deflected to move the socket portion 14 thereof away from the socket portion 12 for permitting insertion of the stud shank 19 through the aperture 15. The spring can then be moved back on the rod 10 to align the sockets 12 and 14 and the spring pressure will snap the lower half of the ball stud into the socket 12. The ball stud is thus resiliently retained in a ball socket. If desired, the rod can be slipped through the spring to disconnect it from the stud S without removing the stud from its location.

In the embodiment of the invention shown in Figures 4, 5 and 6, the reference numeral 21 designates a cylindrical rod such as a throttle rod or the like which is flattened at 22 to provide a flat arm portion and cupped at 23 to provide a hemispherical socket which is open at the major diameter thereof. A spring 24 having a flat arm portion 25 overlying the flat arm portion 22 of the throttle rod 21 is cupped at 26 and apertured at 27 to provide a hemispherical socket mating with the socket provided by the cup 23. The arm 25 of the spring 24 is secured to the arm 22 of the throttle rod 21 by a rivet 28 in spaced relation from the cupped portions 23 and 26 so that the arm of the spring 24 can deflect. The ball stud S has the ball end 18 thereof seated in the ball socket provided by the cups 23 and 26 and the shank 19 of the stud projects freely through the aperture 27 of the cup 26. When the ball end 18 is seated in the ball socket, the spring arm 25 is slightly biased away from the arm 22, as best shown in Figure 6, so that the spring will urge the ball end 18 of the stud into full seating engagement with the ball socket. This biasing of the spring provides an automatic wear take-up to prevent looseness between the ball and socket.

The spring 24 is preferably composed of a heat-treated spring steel stamping. The throttle rod, as is customary, can be composed of mild steel.

The stud S can be assembled in the socket assembly by passing the stud shank 19 through the aperture 27 of the spring to seat the top half of the ball end 18 in the cup 26 of the spring. The bottom half of the ball 18 is then seated in the cup 23 of the throttle rod and the spring is riveted to the throttle rod. Alternately, of course, the spring 24 can be riveted to the throttle rod, rotated to move the cup 26 out of alignment with the cup 23, and the stud shank can then be inserted through the aperture 27 to seat the top half of the ball end 18 in the cup 26. The spring can then be deflected to permit the lower half of the ball end 18 to clear the top of the cup 23 until the cups 26 and 23 are in alignment whereupon the spring can snap the ball into the cup 23. The ball end 18 is resiliently held in the ball socket and the degree of resiliency can be determined by the distance between the rivet 28 and the cup 26 as well as by the stiffness of the spring 24.

In the embodiment shown in Figures 7 and 8, a cylindrical rod such as the throttle rod 29 has a groove 30 therearound in spaced relation from the ends thereof. A connector 31 provides a socket assembly for connecting the stud S to the throttle rod 29. This connector 31 is composed of a pair of heat-treated spring steel stampings 32 secured together intermediate their ends by a rivet 33. Each stamping 32 has an elongated hollow semi-cylindrical end portion 34 adapted to fit around the rod 29. Each portion 34 is indented at 35 to provide a bead for seating in the groove 30 of the throttle rod. The hollow semi-cylindrical portion 34 tapers at 36 to a flat spring arm 37 having a hemispherical ball cup 38 on the end thereof. Each hemispherical ball cup has a semi-circular opening 39 through the top thereof to receive the stud shank 19.

The rivet 33 holds the hollow semi-cylindrical portions 34 of the stampings 32 together to form a cylindrical socket with an annular bead intermediate the ends thereof. This socket is adapted to receive the throttle rod 29 and the halves of the socket can be spread apart to permit the bead to ride over the throttle rod until it snaps into the groove 30 of the rod. The spring arms 37 have tapered opposed mating edges 40 diverging from the rivet 33 to cut away end portions 41 around the front and bottom of the ball cup provided by the hemispherical ball ends 38, as best shown in Figure 7. This cut-away portion 41 provides a recess which facilitates insertion of the ball end of the ball stud S since the cups 38 are adapted to be spread through deflection of the spring arms 37 for accommodating insertion of the ball end of the stud.

The connector 31 of Figures 7 and 8 is thus readily adapted to be snapped onto the end of the throttle rod 29 and is also adapted to have the ball end of a ball stud snapped in the ball socket provided thereby. The ball end, of course, will be resiliently retained in the socket with a degree of resiliency determined by the spacing of the rivet 33 from the socket and by the stiffness of the spring arms 37. The connector can be removed from the ball stud without removing the stud from its location and, in addition, the connector can be removed from the throttle rod without disconnecting the stud from its location.

The bead and groove connection between the connector 31 and throttle rod 29 holds the connector against longitudinal movement relative to the rod, but the connector can swivel or rotate on the rod, if desired, by forming the socket provided by the semi-cylindrical ends 34 of a size for loosely receiving the rod.

In the embodiment of the invention shown in Figures 9 and 10, a connector 42 is composed of a pair of spring steel strips 43 secured together in spaced relation from the ends thereof by means of rivets 44. Each stamping 43 is composed of an elongated band portion with a hemispherical cup 45 on both ends thereof. Each hemispherical cup 45 has an opening or recess 46 therein. The rivets 44 hold the stampings together, to mate the cups 45 and recesses 46 to form a ball socket for the ball end of a stud and to receive the shank of the stud through the opening provided by the mated recesses.

The spring strips 43 are twisted at 47 between the rivets 44 so that the openings of the ball cups 45 will be disposed in right angular relationship. Obviously, of course, the twist 47 could be eliminated or exaggerated to have the stud shanks project in any direction relative to each other.

The ball sockets at the ends of the connector 42 resiliently retain the ball ends of ball studs with a degree of resiliency determined by the stiffness of the spring members 43 and by the spacing of the rivets 44 from the ball sockets.

From the above descriptions it will be understood that the various forms of this invention provide inexpensive socket assemblies especially useful in throttle rod connections for resiliently retaining stud members or the like to provide universal joint connections.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A socket assembly for a stud or the like comprising a socket member having a fragmental segmental spherical socket portion and an arm extending therefrom, a spring member having a complementary fragmental socket portion of segmental spherical configuration and an arm extending therefrom, said socket portions defining a socket having an open end adapted to freely receive therethrough the shank of a ball stud having a head portion tiltable and rotatable in the socket, and means connecting said arms, said means being in spaced relation from the socket portions thereof for allowing the spring to deflect and resiliently retain the stud head in the socket provided by the fragmental socket portions.

2. A throttle rod connector or the like comprising a rod having a flattened end portion with a socket cup thereon, an elongated spring arm having a fragmental socket cup on the end thereof complementing the cup on the rod to form a complete socket, said arm having slots therein in spaced relation from the socket and from each other receiving said rod to hold the arm in serpentine relation on the rod and resiliently urge the cup of the spring arm toward the cup of the rod.

3. A throttle rod connector or the like comprising a rod having a fragmental socket portion, a spring arm having a complementary fragmental socket portion, said spring arm having apertures therein in spaced relation from each other and from said fragmental socket portion thereof receiving said rod to deflect the arm in serpentine relation on the rod for resiliently urging the socket portion of the arm toward the socket portion of the rod.

4. A throttle rod connector or the like comprising a rod having a socket portion, a spring having a cup end and an inclined arm connected to said cup end through a pair of reversed loops, said arm having spaced apertures receiving said rod and deflecting the arm in serpentine relation to urge the loops toward the socket portion of the rod for resiliently retaining the cup end portion of the spring in opposed complementary relation relative to the socket portion of the rod.

5. A socket assembly comprising a member having a semi-socket and an arm extending therefrom, and a spring having a complementary semi-socket and spring arm slidably mounted on said first member in serpentine relation to urge the socket of the spring member toward the socket of the first mentioned member.

6. A throttle rod connector comprising a pair of opposed riveted-together spring steel stampings each having complementary semi-cylindrical and semi-spherical sockets at the ends thereof whereby said connector can be snapped onto a throttle rod and a stud.

7. A snap-on connector comprising a pair of opposed spring members, and a rivet connecting said members intermediate the ends thereof, said members defining a cylindrical socket at one end thereof with an inturned bead intermediate the ends of the socket, said members defining a ball socket at the other end thereof with an aperture accommodating passage of a ball stud shank, said connector adapted to be snapped onto a throttle rod with the bead thereof seated in a groove of the rod and said ball socket of the connector adapted to be snapped onto the ball end of the ball stud.

8. A throttle rod connector comprising a pair of opposed spring strips twisted intermediate their ends, rivets in spaced relation from the ends of the strips securing the strips together, segmental ball seats on the ends of each strip, said segmental ball seats having apertures therein in offset relation, and said rivets resiliently holding the segmental ball seats in complementary relation to define ball sockets adapted to be snapped onto ball studs.

9. A throttle rod connector or the like having a pair of spring straps joined together at points spaced from the ends thereof, each of said straps having an open sided fragmentary ball socket defining portion at each end, said straps being joined so that the open sides of said portions are in opposed relationship to define sockets to receive ball members.

10. A throttle rod connector or the like having a pair of spring straps joined together at points spaced from the ends thereof, each of said straps having an open sided fragmentary ball socket defining portion at each end, said straps being joined so that the open sides of said portions are in opposed relationship to define sockets to receive ball members, said portions being cut off in a plane substantially perpendicular to the plane of the immediately adjoined section of said connector so as to facilitate insertion of a ball arm therein.

BERNARD E. RICKS.
DONALD P. MARQUIS.

REFERENCES CITED

The following references are of record in the file of this patent:

UNITED STATES PATENTS

| Number | Name | Date |
|---|---|---|
| 469,605 | Starks | Feb. 23, 1892 |
| 505,252 | Phillips | Sept. 19, 1893 |
| 799,176 | Marble et al. | Sept. 12, 1905 |
| 1,196,524 | Cluett | Aug. 29, 1916 |
| 1,202,698 | Ford | Oct. 24, 1916 |
| 1,829,305 | Sneed | Oct. 27, 1931 |

FOREIGN PATENTS

| Number | Country | Date |
|---|---|---|
| 524,550 | France | May 16, 1921 |
| 604,501 | France | May 6, 1926 |
| 433,079 | Great Britain | Aug. 8, 1935 |